(12) United States Patent
Takahashi

(10) Patent No.: US 7,562,257 B2
(45) Date of Patent: Jul. 14, 2009

(54) DATA STORAGE SYSTEM, DATA STORAGE CONTROL APPARATUS AND FAULT LOCATION DIAGNOSIS METHOD

(75) Inventor: Hideo Takahashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 403 days.

(21) Appl. No.: 11/442,969

(22) Filed: May 31, 2006

(65) Prior Publication Data
US 2007/0180293 A1 Aug. 2, 2007

(30) Foreign Application Priority Data
Jan. 31, 2006 (JP) ............................. 2006-021750

(51) Int. Cl.
*G06F 11/00* (2006.01)
(52) U.S. Cl. ...................................................... 714/42
(58) Field of Classification Search ................. 714/5–8, 714/11, 13, 15, 16, 18, 27, 42, 47, 52, 54
See application file for complete search history.

(56) References Cited

U.S. PATENT DOCUMENTS

| | | | | |
|---|---|---|---|---|
| 5,544,330 A | * | 8/1996 | Bither et al. | 710/100 |
| 7,013,408 B2 | * | 3/2006 | Knapp, III | 714/7 |
| 7,127,633 B1 | * | 10/2006 | Olson et al. | 714/4 |
| 2005/0120263 A1 | * | 6/2005 | Kano et al. | 714/6 |
| 2005/0246579 A1 | * | 11/2005 | Rust et al. | 714/11 |
| 2008/0065824 A1 | * | 3/2008 | Elliott et al. | 711/112 |

FOREIGN PATENT DOCUMENTS

| | | |
|---|---|---|
| JP | 53-039025 | 4/1978 |
| JP | 60-243731 | 12/1985 |
| JP | 2000-243049 | 9/2000 |
| JP | 2001-306262 | 11/2001 |

* cited by examiner

*Primary Examiner*—Nadeem Iqbal
(74) *Attorney, Agent, or Firm*—Staas & Halsey LLP

(57) ABSTRACT

A controller discriminates the abnormality between a plurality of disk devices and a transmission path in a storage system having controllers for controlling a plurality of disk storage devices. When one controller in pairs of controllers for controlling the plurality of disk storage devices detects an error during an access to a disk drive of interest, a dummy access is made to the disk drive concerned from a controller connected to another transmission path different from the transmission path. Or, an access is made thereto from another initiator of the transmission path, via the transmission path. Then, from the above access result, a suspected fault location is identified.

21 Claims, 9 Drawing Sheets

| PAIR INFORMATION TABLE ||
|---|---|
| PAIRED CM No. | |
| PAIRED PORT STATE | NORMAL |

DATA STORAGE SYSTEM, DATA STORAGE CONTROL APPARATUS AND FAULT LOCATION DIAGNOSIS METHOD

CROSS-REFERENCE TO RELATED APPLICATIONS

This application is based upon and claims the benefit of priority from the prior Japanese Patent Application No. 2006-021750, filed on Jan. 31, 2006, the entire contents of which are incorporated herein by reference.

BACKGROUND OF THE INVENTION

1. Field of the Invention

The present invention relates to a data storage system for use as an external storage apparatus of a computer, a data storage control apparatus, and a fault location diagnosis method therefor, and more particularly, a data storage system having a multiplicity of disk devices and control units connected through transmission paths, a data storage control apparatus, and a fault location diagnosis method therefor.

2. Description of the Related Art

In recent years, as a variety of electronic data are handled in computers, the importance of data storage apparatus (external storage apparatus) capable of storing a large amount of data with high reliability, independently of a host computer executing data processing, is increasing.

As such a data storage apparatus, a disk array apparatus constituted of a large number of disk devices (for example, magnetic disk devices and optical disk devices) and disk controllers for controlling such the large number of disk devices are put into use. The disk array apparatus can simultaneously receive disk access requests from a plurality of host computers and control the large number of disks.

Such the disk array apparatus has an incorporated memory which plays the role of a disk cache. With this, an access time to a data can be reduced when a read request or a write request is received from a host computer, and thus high performance can be obtained.

In general, the disk array apparatus is constituted of a plurality of major units, namely, a channel adaptor provided as a connecting portion to the host computer, a disk adaptor as a connecting portion to a disk drive, a cache memory, a cache controller taking charge of controlling the cache memory, and a large number of disk drives.

In such a complicated system, when a fault occurs in any unit, it is necessary to identify the fault location.

FIG. 10 shows an explanation diagram according to a prior art. A disk array apparatus 110 shown in FIG. 10 includes a pair of control units 112, 114. Each control unit 112, 114 further includes a cache manager (cache memory and cache controller) 122, and a channel adaptor 120 and a disk adaptor 124 which are connected to the cache manager 122.

Also, two cache managers 122 are directly connected to each other so as to enable communication therebetween. The channel adaptor 120 is connected to a host computer 100 by means of a Fiber Channel or an Ethernet (registered trademark). The disk adaptor 124 is connected to each disk drive 130-1 to 130-4 in a disk enclosure by means of, for example, FC loops 140, 142 of the Fiber Channel.

Namely, the disk adaptor 124 in a first control unit 112 accesses each disk drive 130-1 to 130-4 via a first FC loop 140, while the disk adaptor 124 in a second control unit 114 accesses each disk drive 130-1 to 130-4 via a second FC loop 142. With this, duplicated configurations of the control units and the connection paths are realized.

In such the configuration, based on a request from the host 100 via channel adaptor 120, the cache manager 122 in the control unit 112 performs a read access or a write access, via disk adaptor 124, to the disk drive 130-3 via a transmission path 140 such as the Fiber Channel.

At this time, when an error (for example, CRC error) is detected in the disk drive 130-3 or the disk adaptor 124, conventionally, the disk drive on the FC loop 140 is regarded as faulty, and diagnosis is started. Namely, by successively repeating connection and disconnection between the FC loop 140 and each disk drive, the faulty disk drive is identified (for example, Japanese Unexamined Patent Publication No. 2001-306262, FIG. 2).

However, in a storage system in recent years, in addition to redundancy, it is required to continue operation even when a fault occurs in any portion. According to the above prior art, it is difficult to identify which is defective, disk drive 130-3 or the path on FC loop 140 (including the disk adaptor 124).

Accordingly, it is not possible to instantly take an action to cope with the problem, such as accessing to disk drive 130-3 from the other controller (control unit) 114 via FC loop 142 when FC loop 140 is defective, as an example. As a result, it is difficult to continue the operation.

SUMMARY OF THE INVENTION

Accordingly, it is an object of the present invention to provide a data storage system, a data storage control apparatus, and a fault location diagnosis method for identifying whether the location of error occurrence lies on a disk drive cluster or a transmission path on the detection of an error, in the configuration of a controller and a disk drive cluster being connected via a transmission path.

It is another object of the present invention to provide a data storage system, a data storage control apparatus, and a fault location diagnosis method, for simply identifying whether the location of error occurrence lies on a disk drive cluster or a transmission path, on the detection of an error.

It is still another object of the present invention to provide a data storage system, a data storage control apparatus, and a fault location diagnosis method, for identifying whether the location of error occurrence lies on a disk drive cluster or a transmission path on the detection of an error, and for performing substitution processing early after the error is detected, thereby continuing the operation.

In order to achieve the aforementioned objects, a data storage system according to the present invention includes: a plurality of disk storage devices for storing data; and at least a pair of controllers being connected to the plurality of disk storage devices via each different pair of transmission paths, and performing access control of each disk storage device according to an access instruction from an upper level unit. In the above data storage system, one controller accesses the disk storage device via one transmission path, and depending on error detection from a response result received from the disk storage device, the above one controller starts diagnosis processing, requests the other controller to access, via the other transmission path, the disk storage device having been accessed, and receives a response result of the disk storage device from the other controller, so as to identify whether a suspected fault location lies on the disk storage device or the transmission path.

Further, another data storage system according to the present invention includes: a plurality of disk storage devices for storing data; and at least a pair of controllers being connected to the plurality of disk storage devices via a transmission path, and performing access control of each disk storage device according to an access instruction from an upper level unit. In the above data storage system, one controller accesses the disk storage device via the transmission path, and depending on error detection from a response result received from the disk storage device, the above one controller starts diagnosis processing, accesses the other controller via the transmission path, receives a response result from the other controller, so as to identify whether a suspected fault location lies on the disk storage device or the transmission path.

Still further, according to the present invention, a data storage control apparatus includes at least a pair of controllers being connected to a plurality of disk storage devices for storing data, via a transmission path, and performing access control of each disk storage device according to an access instruction from an upper level unit. One controller accesses the disk storage device via one transmission path, and depending on error detection from a response result received from the disk storage device, starts diagnosis processing, and requests the other controller to access, via the other transmission path, the disk storage device having been accessed, and receives a response result of the disk storage device from the other controller, so as to identify whether a suspected fault location lies on the disk storage device or the transmission path.

Further, according to the present invention, a data storage control apparatus includes at least a pair of controllers being connected to the plurality of disk storage devices for storing data, via a transmission path, and performing access control of each disk storage device according to an access instruction from an upper level unit. One controller accesses the disk storage device via the transmission path, and depending on error detection from a response result received from the disk storage device, starts diagnosis processing, and accesses the other controller via the transmission path, and receives a response result from the other controller, so as to identify whether a suspected fault location lies on the disk storage device or the transmission path.

Further, according to the present invention, in a fault location diagnosis method for a data storage system including a plurality of disk storage devices for storing data connected thereto via a transmission path, and performing access control of each disk storage device according to an access instruction from an upper level device, the fault location diagnosis method includes the steps of: starting diagnosis processing by detecting, in one controller, an error from a response result received from the disk storage device having been accessed via the one transmission path; requesting the other controller from the one controller to access, via the other transmission path, the disk storage device having been accessed; receiving a response result of the disk storage device from the other controller; and identifying whether a suspected fault location lies in the disk storage device or the transmission path.

Further, according to the present invention, in a fault location diagnosis method for a data storage system which includes at least a pair of controllers being connected to a plurality of disk storage devices for storing data via a transmission path, and performing access control of each disk storage device according to an access instruction from an upper level device, the fault location diagnosis method includes the steps of: in the one controller, accessing the disk storage device via the transmission path, and detecting an error from a response result received from the disk storage device, and starting diagnosis processing; in the one controller, accessing the other controller via the transmission path, and receiving a response from the other controller; and from the response result, identifying whether a suspected fault location lies in the disk storage device or the transmission path.

Further, according to the present invention, preferably, each controller includes a control unit performing the access control, a first interface section performing interface control with the upper level unit, and a second interface section performing interface control with the plurality of disk storage devices. The above second interface section is connected to the plurality of disk storage devices via the transmission paths.

Further, according to the present invention, preferably, the controller detects a CRC error, as a response result error of the disk storage device.

Further, according to the present invention, preferably, according to a read access from the upper level unit received by the first interface section, the control unit accesses the object disk storage device of the read access via the second interface section, and detects an error from a response result received from the disk storage device.

Further, according to the present invention, preferably, according to a write access from the upper level unit received by the first interface section, the control unit accesses the object disk storage device of the write access via the second interface section, and detects an error from a response result received from the disk storage device.

Further, according to the present invention, preferably, at least the pair of controllers includes: a first pair of controllers being connected to the plurality of disk storage devices via one transmission path, and performing access control of each disk storage device according to an access instruction from the upper level unit; and a second pair of controllers being connected to the plurality of disk storage devices via another transmission path, and performing access control of each disk storage device according to an access instruction from the upper level unit. On detecting an error in the access result of the disk storage device via the one transmission path, one of the first controllers detects that the other transmission path is abnormal, and the one of the first controller executes an access to the other of first controller via the one transmission path, when the other transmission path is detected abnormal.

According to the present invention, when an error is detected in an access to a disk drive of interest, a dummy access to the disk drive concerned is made from a controller being connected to another transmission path different from the transmission path on which the error is detected. Or, an access is made to another initiator on the above transmission path via the transmission path concerned. Thus, from the above access result, it becomes possible to discriminate whether a suspected fault location lies on the transmission path or the disk drive so as to identify the suspected fault location.

Further, by making the dummy access to the disk drive or the initiator on the transmission path, and identifying the suspected fault location from the above access result, it becomes possible to identify the suspected fault location early and simply. As a result, substitution processing can be performed instantly, enabling continued operation.

Further scopes and features of the present invention will become more apparent by the following description of the embodiments with the accompanied drawings.

DETAILED DESCRIPTION OF THE PREFERRED EMBODIMENTS

The preferred embodiment of the present invention is described herein after referring to the charts and drawings, in the order of a data storage system configuration, a first embodiment of fault location diagnosis processing of the data storage system, a second embodiment of the fault location diagnosis processing of the data storage system, and other embodiments.

Data Storage System Configuration

Figure 1:
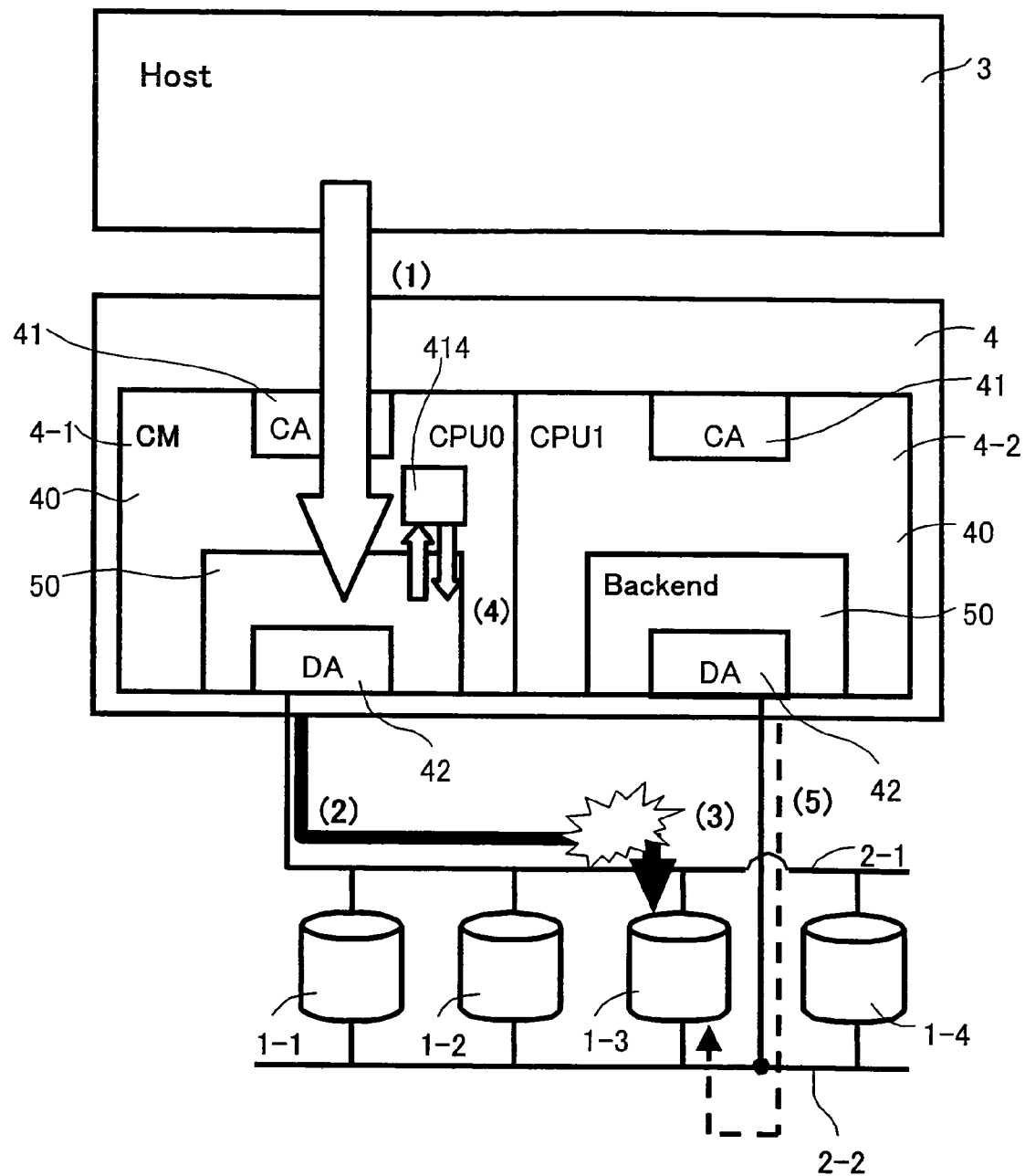
FIG. 1 shows a data storage system according to one embodiment of the present invention.

FIG. 1 shows a data storage system according to one embodiment of the present invention. In this FIG. 1, an example of two controllers (control units) mounted on a storage controller is shown.

As shown in FIG. 1, a storage controller 4 includes a pair of controllers 4-1, 4-2. Each controller 4-1, 4-2 includes a cache manager 40, a channel adaptor 41 and a disk adaptor 42. Further, two controllers 4-1, 4-2 are directly connected with each other so that communication can be performed therebetween. The channel adaptor 41 is connected to a host computer 3 with a Fiber Channel or an Ethernet (registered trademark). The disk adaptor 42 is connected to each disk drive 1-1 to 1-4 in a disk enclosure (described later) with, for example, FC loops 2-1, 2-2 of the Fiber Channel.

Namely, the disk adaptor 42 in the first controller 4-1 accesses each disk drive 1-1 to 1-n via the first FC loop 2-1, while the disk adaptor 42 in the second controller 4-2 accesses each disk drive 1-1 to 1-n via the second FC loop 2-2. Thus, duplicated configurations are realized in both the control units and the connection paths.

Figure 2:
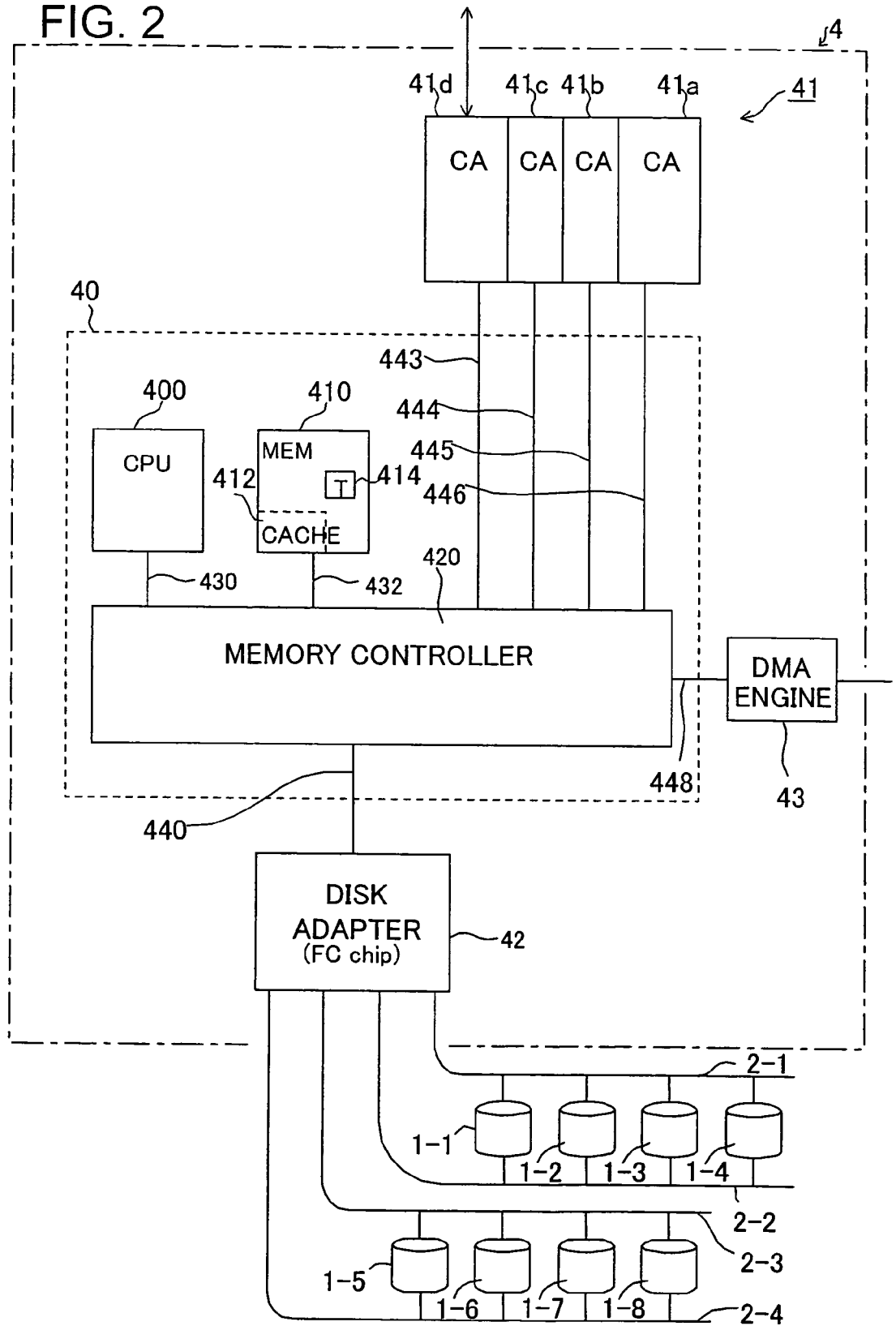
FIG. 2 shows a configuration diagram of a controller shown in FIG. 1.
Figure 3:
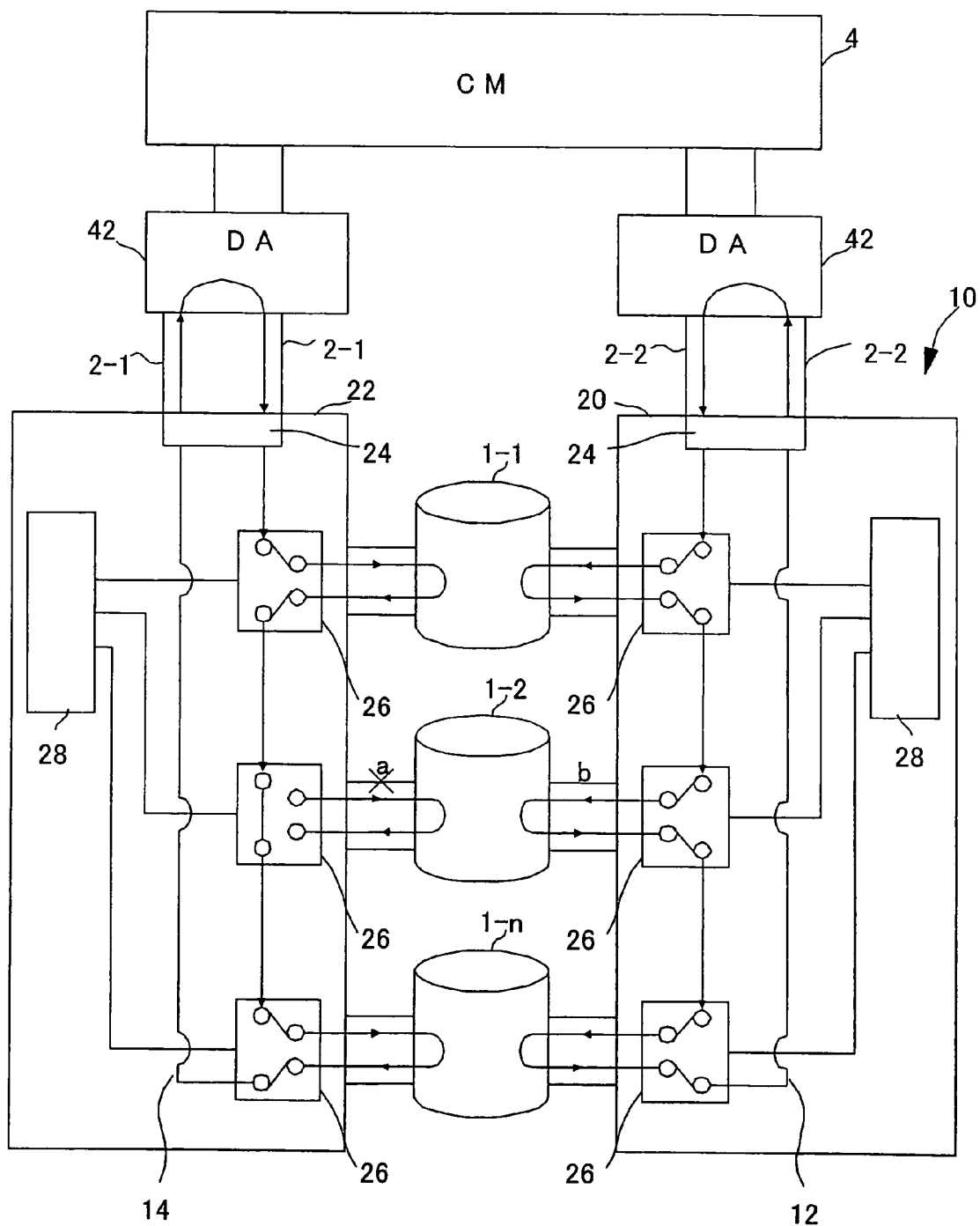
FIG. 3 shows a configuration diagram of transmission paths and disk enclosures shown in FIG. 1.
Figures 4, 5:
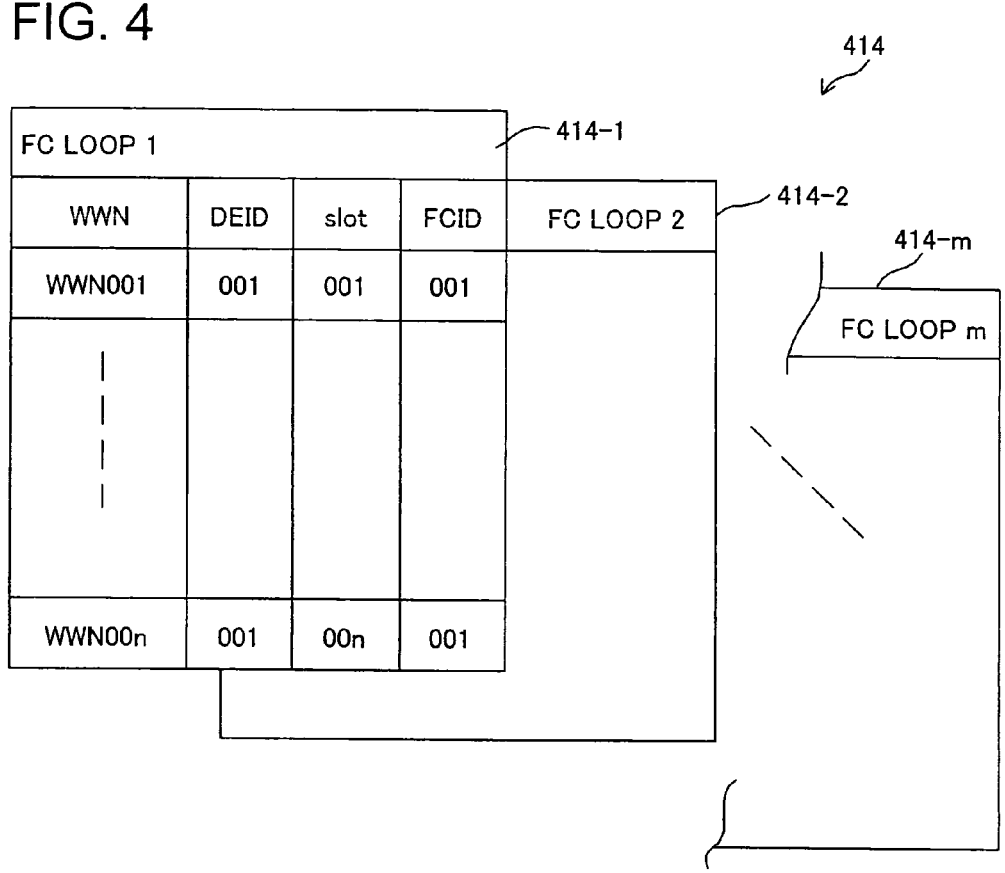
FIG. 4 shows a configuration diagram of an FC loop table corresponding to FIGS. 1 and 2.
FIG. 5 shows an explanation diagram of pair information table corresponding to FIGS. 1 and 2.

FIG. 2 shows a configuration diagram of each controller (control module) 4-1, 4-2 shown in FIG. 1; FIG. 3 shows a configuration diagram of the FC loops and the disk drive cluster shown in FIG. 1; FIG. 4 shows a configuration diagram of an FC loop table corresponding to FIG. 1; and FIG. 5 shows a configuration diagram of a pair information table corresponding to FIG. 1.

As shown in FIG. 2, each control module 4-1, 4-2 (hereafter simply shown by a symbol 4) includes a cache manager 40, the channel adaptor (first interface section; here after referred to as CA) 41 and the disk adaptors (second interface sections; hereafter referred to as DA) 42, and a DMA (direct memory access) engine (communication section; hereafter referred to as DMA) 43.

The cache manager 40 performs read/write processing based on a processing request (read request or write request) from the host computer 3. The cache manager 40 includes a memory 410, a processing unit 400 and a memory controller 420.

The memory 410 includes a cache area 412, which plays the role of a so-called cache for a plurality of disk drives, and stores a portion of data retained in a plurality of disk drives in disk enclosures 10 which will be explained in FIG. 3. Also, the memory 410 includes an FC loop table 414 and other work areas.

The processing unit 400 controls the memory 410, the channel adaptor 41, the disk adaptor 42 and the DMA 43. For this purpose, the processing unit 400 includes one or a plurality of CPUs 400 (one CPU in case of FIG. 1) and a memory controller 420. The memory controller 420 controls read/write of the memory 410, and switches the paths.

The memory controller 420 is connected to the memory 410 via a memory bus 432, and connected to CPU 400 via a CPU bus 430. Further, the memory controller 420 is connected to the disk adaptor 42 via high-speed four-lane serial bus (for example, PCI-Express) 440.

Similarly, the memory controller 420 is connected to the channel adaptors 41 (here, four channel adaptors 41a, 41b, 41c and 41d) via high-speed four-lane serial buses (for example, PCI-Express) 443, 444, 445 and 446. The memory controller 420 is also connected to the DMA 43 via high-speed four-lane serial bus (for example, PCI-Express) 448.

By communicating using packets, and by providing each serial bus with a plurality of lanes, the above high-speed serial buses such as the PCI-Express can communicate at high response speed with a small delay, so-called at a low latency, even in case the number of signal lines is reduced.

The channel adaptors 41a-41d are interfaces to the host computers. Each channel adaptor 41a-41d is connected to a different host computer. Preferably, each channel adaptor 41a-41d is connected to the interface sections of the corresponding host computers via a bus, for example, a Fiber Channel or an Ethernet (registered trademark). In such a case, optical fibers or coaxial cables are used for the buses.

Further, each channel adaptor 41a-41d is configured as a portion of each control module 4. The above channel adaptor 41a-41d supports a plurality of protocols, as an interface section between the corresponding host computer and the cache manager 40.

Because the protocol to be mounted is not the same depending on the corresponding host computers, each channel adaptor 41a-41d is mounted on different printed circuit boards from the cache manager 40 so that each channel adaptor 41a-41d can easily be replaced when necessary.

For example, as protocols with host computers to be supported by the channel adaptors 41a-41d, there are iSCSI (Internet Small Computer System Interface), etc., which can work with the Fiber Channel and the Ethernet (registered trademark), as described above.

Further, as described above, each channel adaptor 41a-41d is directly coupled with cache manager 40 by means of buses 443-446 being designed for the connection among LSIs (Large Scale Integration) and printed circuit boards, such as the PCI-Express. With this, it is possible to achieve high throughput required between each channel adaptor 41a-41d and the cache manager 40.

Next, the disk adaptor 42 is an interface to each disk drive in the disk enclosure, having four FC (Fiber Channel) ports, here.

Also, the disk adaptor 42 is directly coupled with the cache manager 40 by means of a bus being designed for the connection among LSIs and printed circuit boards, such as PCI-Express, as described above. With this, it is possible to achieve high throughput required between the disk adaptor 42 and the cache manager 40.

As shown in FIG. 2, DMA engine 43 is provided for mutual communication between each cache manager 40. For example, DMA engine 43 is used for mirroring processing.

Now, referring to FIG. 3, a transmission path and a disk drive cluster are explained below. In FIG. 3, the disk adaptor 42 having four FC ports is shown by separating into two. As shown in FIG. 3, a disk enclosure 10 includes a pair of Fiber Channel assemblies 20, 22 and a plurality of magnetic disk units (disk drives) 1-1 to 1-n.

Each magnetic disk unit 1-1 to 1-n is connected to a pair of Fiber Channel (FC) loops 12, 14 through each fiber switch 26. The FC loop 12 is connected to a disk adaptor 42 of the controller by means of a Fiber Channel connector 24 and a fiber cable 2-2. The FC loop 14 is connected to the other disk adaptor 42 of the controller by means of a Fiber Channel connector 24 and a fiber cable 2-1

As described earlier, since both disk adaptors 42 are connected to the cache manager 40, the cache manager 40 can access each magnetic disk unit 1-1 to 1-n through one route (route 'a') which passes through the disk adaptor 42 and the FC loop 12, and through the other route (route 'b') which passes through the disk adaptor 42 and the FC loop 14.

Each Fiber Channel assembly 20, 22 include an bypass controller 28. One bypass controller 28 performs isolation (bypass) control of each fiber switch 26 of the FC loop 12, while the other bypass controller 28 performs isolation (bypass) control of each fiber switch 26 of the FC loop 14.

For example, as shown in FIG. 3, when a port 'a' on the FC loop 14 side of the magnetic disk unit 1-2 cannot be accessed, the bypass controller 28 switches the fiber switch 26 on the port 'a' side of the magnetic disk unit 1-2 to a bypass state, so as to disconnect the magnetic disk unit 1-2 from the FC loop 14, as shown in FIG. 3. With this, the FC loop 14 functions normally, and the magnetic disk unit 1-2 can be accessed from the port 'b' of the FC loop 12 side.

Each magnetic disk unit 1-1 to 1-n includes a pair of Fiber Channel (FC) chips for connecting to the port 'a' and the port 'b', a control circuit, and a disk drive mechanism. The FC chips have CRC (Cyclic Redundancy Check) functions.

Here, the disk drives 1-1 to 1-4 shown in FIG. 1 correspond to the magnetic disk drives 1-1 to 1-n shown in FIG. 3, and the transmission paths 2-1, 2-2 correspond to the fiber cables 2-1, 2-2 and the Fiber Channel assemblies 20, 22.

As shown in FIG. 4, Fiber Channel (FC) loop table 414 includes map tables 414-1 to 414-m for each Fiber Channel path 2-1, 2-2. In each map table 414-1 to 414-m, there are stored a WWN (World Wide Name) of each magnetic disk unit connected to each FC loop, an ID number of disk enclosure 10 accommodating the magnetic disk units, a slot number indicating each accommodation location of the magnetic disk units in the disk enclosure 10, and an ID number of the FC loop.

FIG. 5 shows a configuration diagram of pair information table 416 created in the memory 410, which stores the numbers of controllers to be paired and the states of paired ports (here, paired loops).

First Embodiment

Next, referring to FIG. 1, a first embodiment of the fault location diagnosis processing is described. First, based on a request from the host 3, a first controller 4-1 accesses a disk drive 1-3 for read or write operation, via the disk adaptor 42 and the transmission path 2-1 such as Fiber Channel.

Triggered by the detection of an error, the first controller 4-1 starts diagnosis, and performs a dummy access to the disk drive 1-3 from the second controller 4-2, via the disk adaptor 42 and the path 2-2 on the other side of the pair.

The second controller 4-2 informs the first controller 4-1 about a response result of the dummy access. From the response result, when no CRC error is detected and the read access is completed normally, the first controller 4-1 determines that a portion of controller 4-1 (for example, the disk adaptor 42) or the path of FC loop 2-1 is faulty. Namely, the disk drive 1-3 is determined normal.

On the other hand, when a CRC error of the disk drive 1-3 of interest is detected, the first controller 4-1 identifies that the disk drive 1-3 concerned is faulty. Namely, it is determined that both a portion of controller 4-1 (for example, disk adaptor 42) and the path of FC loop 2-1 are normal.

Referring to FIG. 1, the above diagnosis processing is described below.

(1) The host 3 requests the cache manager 40 to perform a disk access, via the channel adaptor 41 of the first controller 4-1.

(2) Back-end processing 50 in the cache manager 40 performs the disk access to the disk drive 1-3 via the disk adaptor 42 and the FC loop 2-1.

(3) In the above disk access, error detection is carried out. For example, either disk drive 1-3 or disk adaptor 42 detects a CRC error.

(4) The back-end processing 50 in the cache manager 40 confirms the table 414 having disk information stored therein, and extracts the state of the other FC loop 2-2, to which the disk drive 1-3 of interest is connected, and the information of the controller 4-2.

(5) The cache manager 40 in the first controller 4-1 requests the second controller 4-2 to perform a dummy access. Back-end processing 50 in the cache manager 40 of the second controller 4-2 performs the dummy access (read) to the disk drive 1-3, via the disk adaptor 42 and the other FC loop 2-2.

(6) The second controller 4-2 receives a response result from the disk drive 1-3 via the FC loop 2-2 and the disk adaptor 42, and then informs the cache manager 40 in the first controller 4-1 about the above response result. The cache manager 40 identifies a suspected fault location through the aforementioned decision whether or not a CRC error is existent.

As such, when an error is detected in an access to the disk drive of interest, the controller 4-1 performs a dummy access to the disk drive concerned through the different transmission path from the transmission path concerned, and identifies the suspected fault location. Thus, it is possible to discriminate whether the suspected fault location lies on the transmission path or the disk drive.

Also, since the suspected fault location is identified from the result of the dummy access to the disk drive through the other transmission path, it becomes possible to identify the suspected fault location early and simply. As a result, substitution processing can be performed instantly, enabling continued operation.

For example, when a portion of the controller 4-1 (for example, the disk adaptor 42) or the path of the FC loop 2-1 is determined faulty, an access to the disk drive 1-3 is made using the other disk adaptor 42 and the FC loop 2-2. Or when the disk drive 1-3 is determined faulty, a redundant data in another disk drive is accessed in case of a RAID structure.

Figure 6:
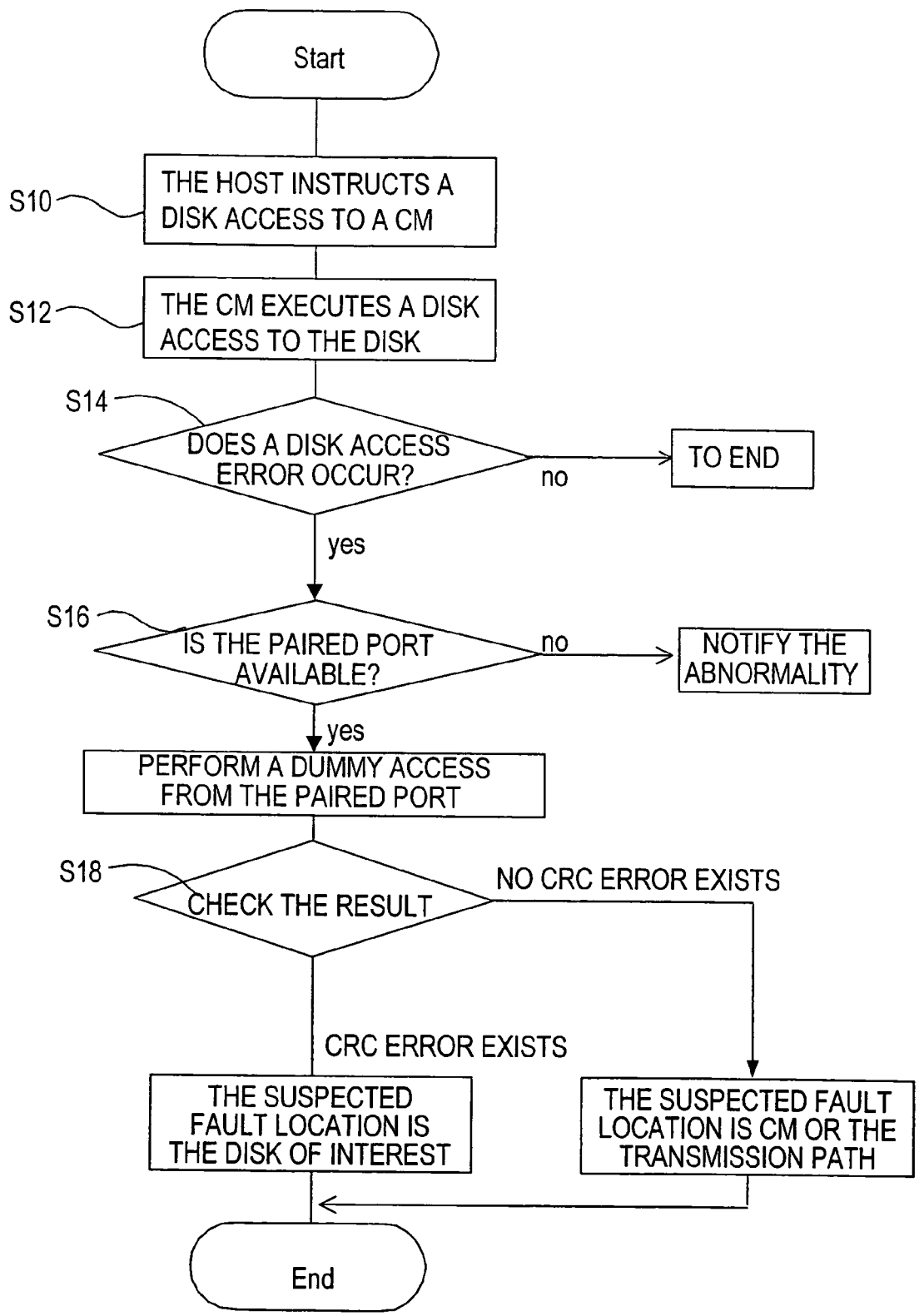
FIG. 6 shows a flowchart of fault location diagnosis processing according to one embodiment of the present invention.

Next, fault location diagnosis processing of a data storage system shown in FIGS. 1 through 5 is described, taking a read access as an example. FIG. 6 shows a flowchart of the fault location diagnosis processing according to one embodiment of the present invention.

(S10) When the cache manager 40 receives a read request from a host computer via the corresponding channel adaptor 41a-41d, if the object data of the read request concerned is retained in the cache memory 410, the cache manager 40 sends the above object data retained in the cache memory 410 to the host computer via the channel adaptor 41a-41d.

(S12) On the other hand, if the object data concerned is not retained in the cache memory 410, CPU 400 in the cache manager 40 instructs the disk drive retaining the object data (disk drive 1-3 in the example of FIG. 1) to perform a disk access (read access), via disk adaptor 42, FC cable 2-1 and FC assembly 22. For example, CPU 400 instructs the disk adaptor 42 to perform DMA transfer. More specifically, CPU 400 in the cache manager 40 generates an FC header and a descriptor in a descriptor area of the memory 410. Here, the descriptor is an order requesting a data transfer circuit to perform data transfer. The descriptor includes an FC header address in the memory, an address in the cache area 412 for receiving the transfer and a data byte count, and a disk logical address of the data for transfer. Then, CPU 400 initiates the data transfer circuit in the disk adaptor 42. The initiated data transfer circuit in the disk adaptor 42 reads out the descriptor from the memory 410. The initiated data transfer circuit in the disk adaptor 42 reads out the FC header and the descriptor from the memory 410, decodes the descriptor, obtains the requested disk, the top address and the byte count, and transfers the FC header to the object disk drive 1-3 via the Fiber Channel 2-1, by means of the Fiber Channel assembly 22.

(S14) The disk drive 1-3 reads out the requested object data from the disk, and transmits the read data to the data transfer circuit in the disk adaptor 42, via the fiber loop 14 and the fiber cable 2-1. The disk adaptor 42 then checks the CRC of the transmitted object data, and decides whether a disk access error occurs (whether an error is detected in the CRC check).

When the disk access error is not detected, the initiated data transfer circuit in the disk adaptor 42 reads out the read data from the memory in the disk adaptor 42, and stores the read data into the cache area 412 of the memory 410. On completion of the read data transfer, the data transfer circuit notifies the cache manager 40 of the completion of the data transfer with an interruption. Subsequently, the cache manager 40 initiates the DMA transfer circuit in the channel adaptor 41, so as to perform DMA transfer of the read data being stored in the cache area 412, to the host 3 having requested the readout.

(S16) On the contrary, when the disk adaptor 42 detects a CRC check error, the cache manager 40 executes fault location diagnosis processing. Namely, the cache manager 40 refers to the FC loop table 414 shown in FIG. 4, so as to extract FC loop 2-1, on which the disk drive 1-3 of interest is existent, and information (WWN) of the disk drive 1-3 concerned.

Next, CPU 400 refers to the pair port information table 416 (refer to FIG. 5) in the memory 410 and confirms the states of the paired cache manager (CM) and the paired port (paired FC loop). CPU 400 judges whether the paired port is usable or not from the states of the paired cache manager (CM) and the paired port. When the paired port is not usable, CPU 400 notifies of the abnormality, and terminates the processing.

On the other hand, on determining that the paired port is normal, CPU 400 requests the paired CM (here, CPU 400 in the controller 4-2) to perform a dummy access to the disk drive 1-3 concerned. The requested controller 4-2 performs the dummy access (read) from the second FC loop 2-2 to the disk drive 1-3, via the disk adaptor 42. The above read access is similar to the access performed in step S12.

(S18) The disk drive 1-3 reads out the requested object data, and transfers the read data to the data transfer circuit in the disk adaptor 42 via the fiber loop 12 and the fiber cable 2-2. The disk adaptor 42 then checks the CRC of the object data transmitted from the disk drive, and decides whether a disk access error occurs (whether an error is detected in the CRC check). Thereafter, the controller 4-2 notifies CPU 400 in the controller 4-1 of the decision result.

CPU 400 in the controller 4-1 decides a suspected fault location from the decision result. Namely, when the response result from the disk drive 1-3 indicates that the access has failed (for example, a CRC error is detected), CPU 400 identifies that the suspected fault location lies on the disk drive 1-3. On the other hand, when the response result from the disk drive 1-3 indicates the access has been successful (for example, no detection of CRC error), CPU 400 identifies whether the suspected fault location lies on the disk adaptor 42 of the controller 4-1 or the transmission path (fiber cable 2-1 or Fiber Channel assembly 22).

As such, when an error is detected in the access to the disk drive of interest, a dummy access to the disk drive concerned is performed via the other paired transmission path. From the result of the above dummy access, a suspected fault location is identified. Thus, it is possible to discriminate whether the suspected fault location lies on the transmission path or the disk drive.

Also, since the suspected fault location is identified from the result of the dummy access to the disk drive through the other normal transmission path, it becomes possible to identify the suspected fault location early and simply. As a result, substitution processing can be performed instantly, enabling continued operation.

Next, in the case of write access, the procedure is similar to the above. In this case, the controller 40 performs a write access to an object disk drive 1-3 via the disk adaptor 42. When the object disk drive 1-3 detects a CRC error, the object disk drive 1-3 notifies the disk adaptor 42 of a CRC error response. By this, diagnosis for a suspected fault location is started. Similarly to the case of the read access, by performing a dummy write access to the disk drive via the other paired transmission path, the suspected fault location can be identified from the write response result.

By way of example, a transmission path fault includes the abnormality of a light emitting section or a light receiving section of an FC chip in the disk adaptor 42, the abnormality of the FC cable 2-1, and the abnormality of the Fiber Channel assembly 22. Meanwhile, abnormality in the disk drive 1-3 includes the defective connection of the disk drive 1-3 and the abnormality of an FC chip.

Second Embodiment

Figure 7:
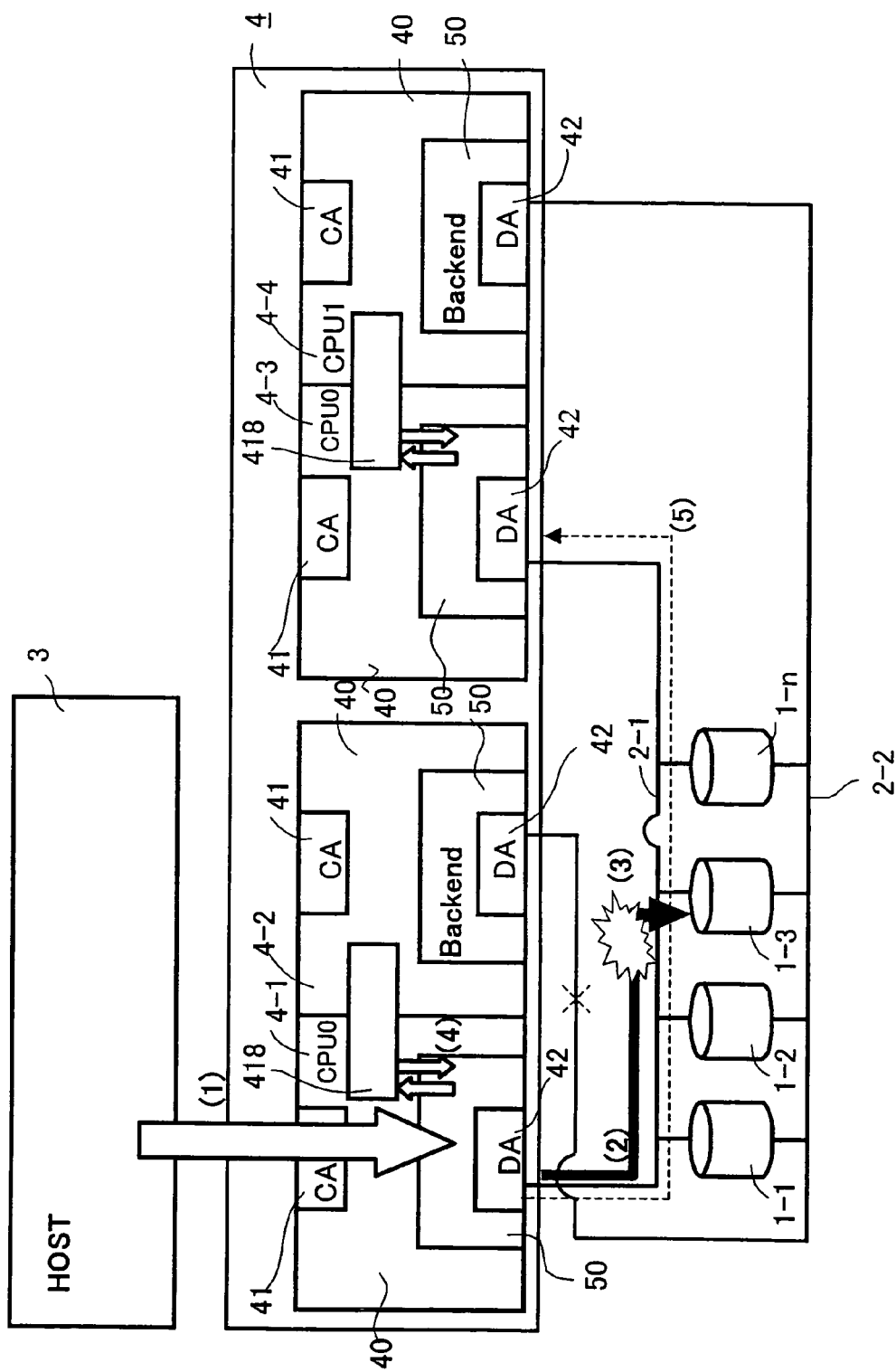
FIG. 7 shows a configuration diagram of a data storage system according to another embodiment of the present invention.

FIG. 7 shows a configuration diagram of a data storage system according to a second embodiment of the present invention. In FIG. 7, like parts to those shown in FIGS. 1 through 3 are referred to by like symbols. In FIG. 7, a storage controller 4 has a pair of controller pairs. Namely, the storage controller 4 includes a pair of controllers 4-1, 4-2 connected to one end of each different FC loop 2-1, 2-2, and a pair of controllers 4-3, 4-4 connected to the other end of each different FC loop 2-1, 2-2.

Each controller 4-1, 4-2, 4-3 or 4-4 includes a cache manager 40, a channel adaptor 41 and a disk adaptor 42. Further, each of the four controllers 4-1, 4-2, 4-3 and 4-4 are directly connected so that communication can be performed therebetween. The channel adaptor 41 is connected to a host computer 3 with Fiber Channel or Ethernet (registered trademark).

The disk adaptors 42 in the first controller 4-1 and the third controller 4-3 access each disk drive 1-1 to 1-n via a first FC loop 2-1, while the disk adaptors 42 in the second controller 4-2 and the fourth controller 4-4 access each disk drive 1-1 to 1-n via a second FC loop 2-2. Thus, duplicated configurations of control units and connection paths are realized, as well as duplicated accesses through one connection path. Namely, a multi-initiator structure for a path is adopted.

Now, referring to FIG. 7, the second embodiment of the fault location diagnosis processing is described below.

(1) The host 3 requests the cache manager 40 to perform a disk access, via the channel adaptor 41 of the first controller 4-1.

(2) Back-end processing 50 in the cache manager 40 performs the disk access to the disk drive 1-3, via the disk adaptor 42 and the FC loop 2-1.

(3) In the above disk access, error detection is carried out. For example, either disk drive 1-3 or disk adaptor 42 detects a CRC error.

(4) Back-end processing 50 in the cache manager 40 confirms a configuration information table 418 having configuration information stored therein (table 418 will be described later), and extracts the state of the other FC loop 2-2 and the state of paired ports of accessed FC loop 2-1, to which disk drive 1-3 of interest is connected, and information of the controller 4-3 of the above paired ports.

(5) When the other FC loop 2-2 is not normal, and the state of the paired ports is normal, the cache manager 40 in the first controller 4-1 issues a patrol command to the third controller 4-2. Namely, back-end processing 50 in the cache manager 40 of the first controller 4-1 issues the patrol command for reading a data stored in the memory 410 of the cache manager 40 of the third controller 4-3, to the disk adaptor 42 of the third controller 4-3 via the disk adaptor 42 and the FC loop 2-1.

(6) By this, the third controller 4-3 transmits from the disk adaptor 42 the data in the memory 410 to the disk adaptor 42 of the first controller 4-1 via the FC loop 2-1. The disk adaptor 42 in the first controller 4-1 executes the CRC check of the received read data. The cache manager 40 in the first controller 4-1 identifies a suspected fault location through the aforementioned decision whether or not a CRC error occurs.

Namely, when no CRC error is detected and the read access is completed normally, it is determined that a portion of the controller 4-1 (for example, the disk adaptor 42) and the path of FC loop 2-1 is normal. Namely, the disk drive 1-3 is determined faulty.

On the other hand, when a CRC error is detected, the first controller 4-1 determines that the disk drive 1-3 is normal. Namely, it is determined that a portion of the controller 4-1 (for example, the disk adaptor 42) or the path of FC loop 2-1 is faulty.

As such, in the multi-initiator configuration, on detecting an error in an access to the disk drive of interest, the controller 4-1 issues a patrol command to the controller 4-3 of the paired port from the transmission path for the above access. From the result thereof, a suspected fault location is identified. Thus, it is possible to discriminate whether the suspected fault location lies on the transmission path or the disk drive.

Also, since the suspected fault location is identified from the result of the dummy access to the controller of the paired port through the same transmission path, it becomes possible to identify the suspected fault location early and simply, even when the other transmission path is abnormal. As a result, substitution processing can be performed instantly, enabling continued operation.

Figure 8:
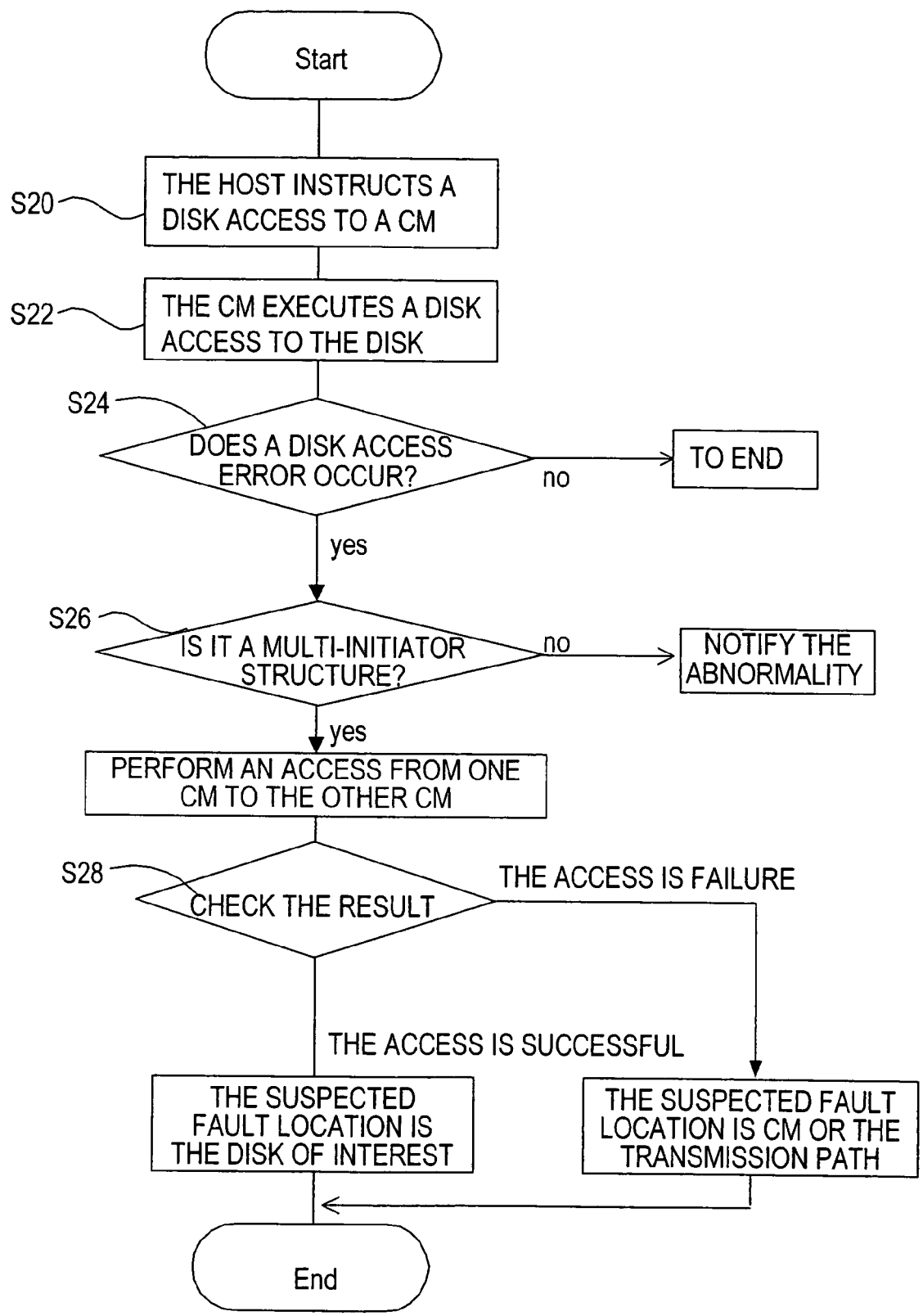
FIG. 8 shows a flowchart of fault location diagnosis processing according to another embodiment of the present invention.
Figure 9:
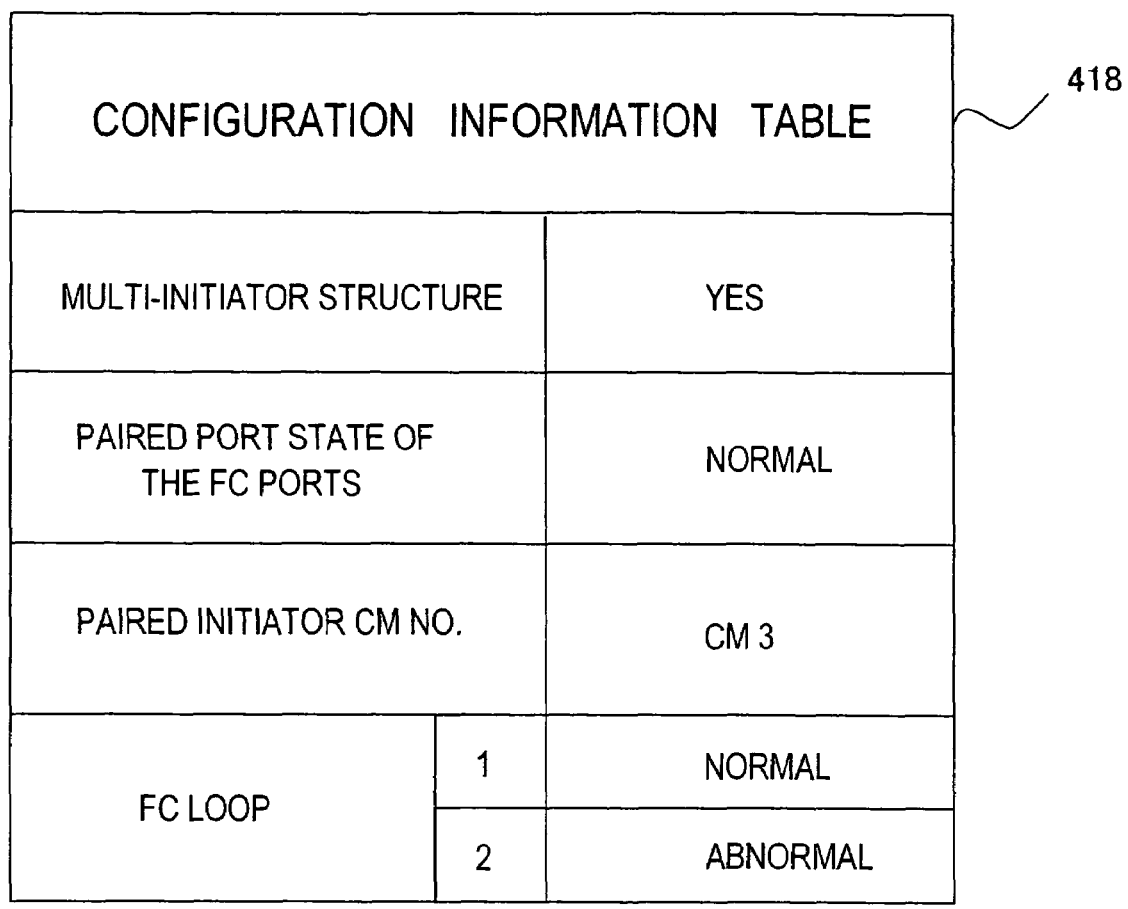
FIG. 9 shows an explanation diagram of a configuration information table corresponding to FIGS. 7 and 8.
Figure 10:
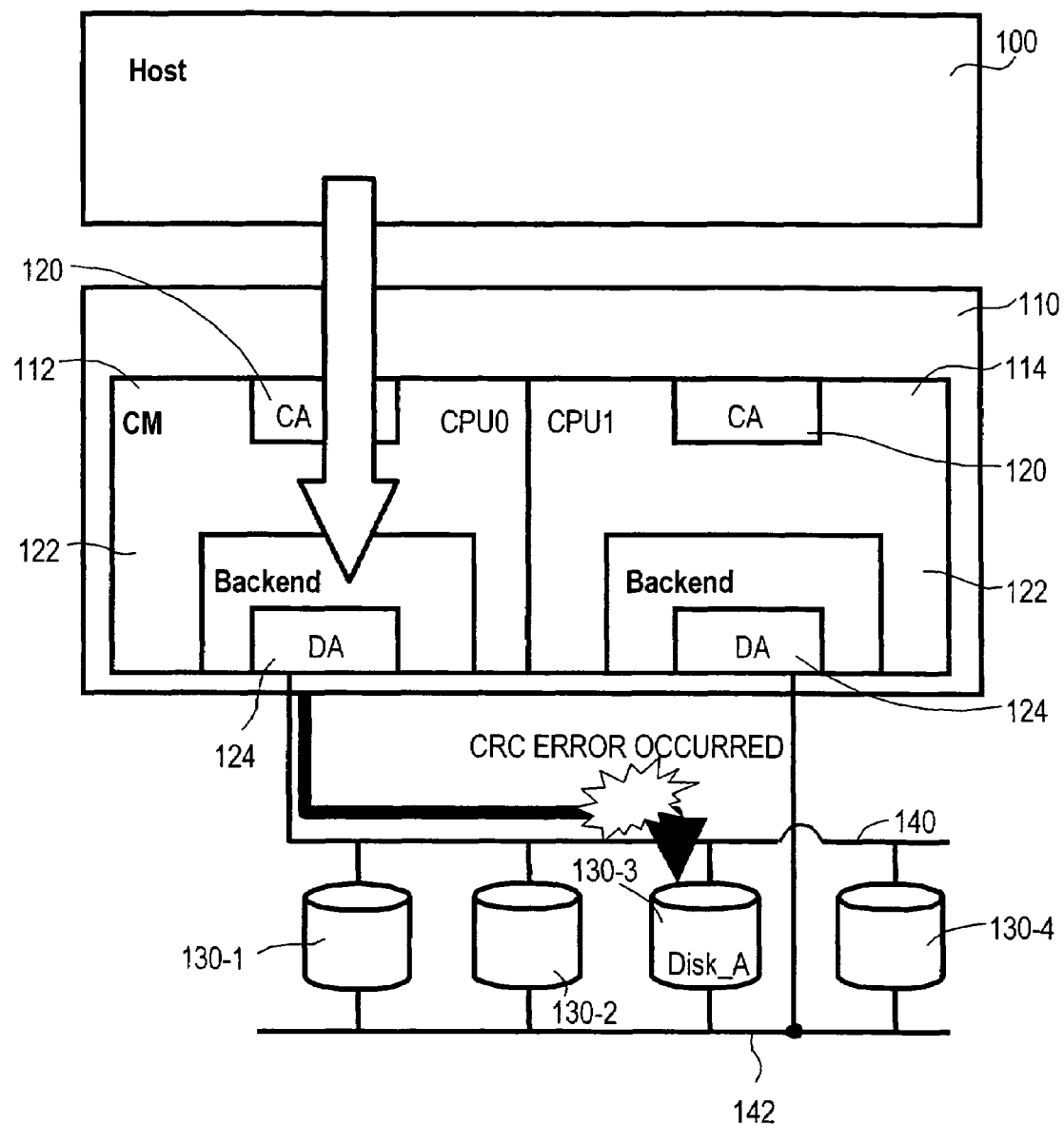
FIG. 10 shows a configuration diagram of a conventional storage system.

Next, fault location diagnosis processing of the data storage system shown in FIG. 7 is described, taking a read access as an example. FIG. 8 shows a flowchart of the fault location diagnosis processing according to the second embodiment of the present invention. FIG. 9 shows an explanation diagram of a configuration information table corresponding to FIG. 7.

(S20) When the cache manager 40 receives a read request from a host computer via the corresponding channel adaptor 41a-41d, and if the object data of the read request concerned is retained in the cache memory 410, the cache manager 40 sends the above object data retained in the cache memory 410 to the host computer via the channel adaptor 41a-41d.

(S22) On the other hand, if the object data is not retained in the cache memory 410, CPU 400 in the cache manager 40 instructs the disk drive retaining the object data (the disk drive 1-3 in the example of FIG. 7) to perform a disk access (read access) via the disk adaptor 42, the FC cable 2-1 and the FC channel assembly 22.

For example, CPU 400 instructs the disk adaptor 42 to perform DMA transfer. More specifically, CPU 400 in the cache manager 40 creates an FC header and a descriptor in a descriptor area of the memory 410. Here, the descriptor is an order requesting a data transfer circuit to perform data transfer. The descriptor includes an FC header address in the memory, an address in the cache area 412 and a byte count of the data to be received, and a disk logical address of the data to be transferred. Then, CPU 400 initiates the data transfer circuit in the disk adaptor 42.

The initiated data transfer circuit in the disk adaptor 42 reads out the descriptor from the memory 410. The initiated data transfer circuit in the disk adaptor 42 reads out the FC header and the descriptor from the memory 410, decodes the descriptor, obtains the requested disk, the top address and the byte count, and transfers the FC header to the object disk drive 1-3 by means of the Fiber Channel assembly 22 via the Fiber Channel 2-1.

(S24) The disk drive 1-3 reads out the requested object data from the disk, and transmits the read data to the data transfer circuit in the disk adaptor 42, via the fiber loop 14 and the fiber cable 2-1. The disk adaptor 42 then checks the CRC of the transmitted object data, and decides whether a disk access error occurs (whether an error is detected in the CRC check).

When the disk access error is not detected, the initiated data transfer circuit in the disk adaptor 42 reads out the read data from the memory in the disk adaptor 42, and stores the read data into the cache area 412 of the memory 410. On completion of the read data transfer, the data transfer circuit notifies the cache manager 40 of the completion of the data transfer with an interruption. Subsequently, the cache manager 40 initiates the DMA transfer circuit in the channel adaptor 41, then the DMA transfer circuit transfers the read data in the cache area 412 to the host 3 having requested the readout, with DMA transfer.

(S26) On the contrary, when the disk adaptor 42 detects a CRC check error, the cache manager 40 executes fault location diagnosis processing. Namely, the cache manager 40 refers to the configuration information table 418 shown in FIG. 9. The configuration information table 418 in FIG. 9 stores information in regard to whether or not the multi-initiator structure is incorporated, the states of FC loops 2-1, 2-2, the state of paired port of the FC ports, and a paired initiator CM number.

The cache manager 40 examines the state of the FC loops. Here, because the FC loop 2-2 (2) is indicated abnormal as illustrated in FIG. 7, it is not possible to perform the fault location diagnosis processing according to the first embodiment, by use of the second controller 4-2. Therefore, the cache manager 40 executes the fault location diagnosis processing using the FC loop 2-1 (2), which is indicated normal prior to the diagnosis.

The cache manager 40 then examines whether the multi-initiator structure is incorporated. If the multi-initiator structure is determined, the cache manager 40 examines the state of the controller 4-3 of the paired port to which the disk drive 1-3 of interest is connected.

When the cache manager 40 of the first controller 4-1 decides that the other FC loop 2-2 is abnormal and the state of the paired port is normal, back-end processing 50 in the cache manager 40 issues a patrol command to the disk adaptor 42 of the third controller 4-3, via the disk adaptor 42 and the FC loop 2-1, so as to read a data stored in the memory 410 of the cache manager 40 of the third controller 4-3.

(S28) By this, the third controller 4-3 transmits the data in the memory 410 to the disk adaptor 42 of the first center 4-1, from the disk adaptor 42 via the FC loop 2-1. The disk adaptor 42 in the first controller 4-1 executes the CRC check on the received read data. From the decision whether a CRC error exists or not, the cache manager 40 in the first controller 4-1 identifies a suspected fault location.

Namely, when the response result from paired port (paired CM) 4-3 indicates that the access failed (for example, detection of CRC error), CPU 400 in the cache manager 40 identifies whether the suspected fault location lies on the disk adaptor 42 of the controller 4-1 or the transmission path (fiber cable 2-1 and Fiber Channel assembly 22). On the other hand, when the response result from the paired port (paired CM) 4-3 indicates that the access is successful (for example, no detection of CRC error), CPU 400 identifies that the suspected fault location lies on the disk drive 1-3.

As such, when an error is detected in the access to the disk drive of interest, an access to the paired initiator is performed via the transmission path concerned. From the above access result, a suspected fault location is identified. Thus, it is possible to discriminate whether the suspected fault location lies on the transmission path or the disk drive.

Also, since the suspected fault location is identified from the access result to the paired initiator through the transmission path concerned, even when the other transmission path is abnormal, it becomes possible to identify the suspected fault location early and simply. As a result, substitution processing can be performed instantly, enabling continued operation.

Next, in the case of write access, procedure is similar to the above. In this case, the controller 40 performs a write access to an object disk drive 1-3 via the disk adaptor 42. On detecting a CRC error, the object disk drive 1-3 notifies the disk adaptor 42 of a CRC error response. By this, diagnosis for a suspected fault location is started. By performing a dummy write access to the paired initiator 4-3 via the transmission path concerned in a similar manner to the read access, the suspected fault location can be identified from the write response result.

By way of example, a transmission path fault includes the abnormality of a light emitting section or a light receiving section of an FC chip in the disk adaptor 42, the abnormality of the FC cable 2-1, and the abnormality of the Fiber Channel assembly 22. Meanwhile, abnormality in the disk drive 1-3 includes the defective connection of the disk drive 1-3 and the abnormality of an FC chip.

Other Embodiments

In the aforementioned embodiments, the response error to an access is described using the CRC error. However, other response errors, such as no response for a certain time and a reception error, are possible. Further, the number of channel adaptors and/or disk adaptors in a control module may be increased or decreased, depending on the necessity. Similarly, although the description of two controllers 4-1, 4-2 has been made in the first embodiment, the present invention is also applicable to such a structure as that having more than two controllers. Moreover, there has been described an example that the second embodiment is applied when the diagnosis according to the first embodiment cannot be performed. However, it may also be possible to perform the second embodiment individually, by omitting the decision whether or not the diagnosis processing according to the first embodiment can be performed.

Further, as disk drive, storage devices such as hard disk drive, optical disk drive and magneto-optical disk may be applied. In addition, the structures of the storage system and controller (control module) are not limited to the structures shown in FIGS. 1, 2, 3 and 7, and the present invention is applicable to other structures.

The foregoing description of the embodiments is not intended to limit the scope of the present invention to the particular details. Any possible modification and equivalents are not to be excluded from the scope of the present invention. All features and advantages of the invention which fall within the scope of the invention are covered by the appended claims.

What is claimed is:

1. A data storage system comprising:
   a plurality of disk storage devices for storing data; and
   at least a pair of controllers being connected to the plurality of disk storage devices via each different transmission paths, and performing access control of each disk storage device according to an access instruction from an upper level unit,
   wherein when one controller accesses the disk storage device via one transmission path and detects an error from a response result received from the disk storage device, one controller starts diagnosis processing, and requests the other controller to access, via the other transmission path, the disk storage device having been accessed,
   said other controller accesses, via the other transmission path, the disk storage device according to said request, and receives a response result from the disk storage device,
   said one controller receives said response result of the disk storage device from the other controller, and identifies whether a suspected fault location lies in the disk storage device or the transmission path from the response result, and
   wherein said one controller identifies that said suspected fault location lies in the disk storage device when detecting said error from the response result, and identifies that said suspected fault location lies in the transmission path when not detecting said error from the response result.

2. The data storage system according to claim 1, wherein each controller comprises:
   a control unit performing the access control;
   a first interface section performing interface control with the upper level unit; and a second interface section performing interface control with the plurality of disk storage devices and being connected to the plurality of disk storage devices via the transmission paths.

3. The data storage system according to claim 1, wherein the controller detects a CRC error, as a response result error of the disk storage device.

4. The data storage system according to claim 2, wherein, according to a read access from the upper level unit received by the first interface section, the control unit accesses an object disk storage device of the read access via the second interface section, and detects an error from a response result received from the disk storage device.

5. The data storage system according to claim 2, wherein, according to a write access from the upper level unit received by the first interface section, the control unit accesses an object disk storage device of the write access via the second interface section, and detects an error from a response result received from the disk storage device.

6. A data storage system comprising:
a plurality of disk storage devices for storing data; and
at least a pair of controllers being connected to the plurality of disk storage devices via a transmission path, and performing access control of each disk storage device according to an access instruction from an upper level unit,
wherein when one controller accesses the disk storage device via the transmission path and detects an error from a response result received from the disk storage device, one controller starts diagnosis processing, accesses the other controller via the transmission path, receives a response of said access returned from the other controller via the transmission path, and identifies whether a suspected fault location lies in the disk storage device or the transmission path from said response, and
wherein said one controller identifies that said suspected fault location lies in the disk storage device when not detecting said error from the response that identifies that said suspected fault location lies in the transmission path when detecting said error from the response.

7. The data storage system according to claim 6, wherein said pair of controller comprises:
a first pair of controllers being connected to the plurality of disk storage devices via one transmission path, and performing access control of each disk storage device according to an access instruction from an upper level unit; and
a second pair of controllers being connected to the plurality of disk storage devices via another transmission path, and performing access control of each disk storage device according to an access instruction from said upper level unit,
wherein, when one of first pair controllers detects an error in the access result of the disk storage device via the one transmission path, said one controller detects that the other transmission path is abnormal, executes an access to the other of said first pair controller via the one transmission path, when the other transmission path is detected abnormal.

8. A data storage control apparatus comprising:
a first controller being connected to a plurality of disk storage devices for storing data, via one transmission path, and performing access control of each disk storage device according to an access instruction from an upper level unit; and
a second controller being connected to said plurality of disk storage devices for storing data, via another transmission path, and performing access control of each disk storage device according to an access instruction from said upper level unit,
wherein when said first controller accesses the disk storage device via said one transmission path and detects an error from a response result received from the disk storage device, said first controller starts diagnosis processing, requests the second controller to access, via another transmission path, the disk storage device having been accessed, and
the other controller accesses, via the other transmission path, the disk storage device according to said request, and receives a response result from the disk storage device,
said one controller receives said response result of the disk storage device from the second controller, and identifies whether a suspected fault location lies in the disk storage device or the transmission path from said response result,
and wherein said one controller identifies that said suspected fault location lies in the disk storage device when detecting said error from the response result, and identifies that said suspected faults location lies in the transmission path when not detecting said error from the response result.

9. The data storage control apparatus according to claim 8, wherein each of said first and second controller comprises:
a control unit performing the access control;
a first interface section performing interface control with the upper level unit; and
a second interface section performing interface control with the plurality of disk storage devices and being connected to the plurality of disk storage devices via the transmission paths.

10. The data storage control apparatus according to claim 8, wherein the controller detects a CRC error, as a response result error of the disk storage device.

11. The data storage control apparatus according to claim 9, wherein, according to a read access from the upper level unit received by the first interface section, the control unit accesses the object disk storage device of the read access via the second interface section, and detects an error from a response result received from the disk storage device.

12. The data storage control apparatus according to claim 9, wherein, according to a write access from the upper level unit received by the first interface section, the control unit accesses the object disk storage device of the write access via the second interface section, and detects an error from a response result received from the disk storage device.

13. A data storage control apparatus comprising:
at least a pair of controllers being connected to the plurality of disk storage devices for storing data, via a transmission path, and performing access control of each disk storage device according to an access instruction from an upper level unit,
wherein when one controller accesses the disk storage device via the transmission path end detects an error from a response result received from the disk storage device, said one controller starts diagnosis processing, accesses the other controller via the transmission path, receives a response of said access returned result from the other controller via the transmission path, and identifies whether a suspected fault location lies in the disk storage device or the transmission path from said response, and wherein said one controller identifies that said suspected fault location lies in the disk storage device when not detecting said error from the response, and identifies that said suspected fault location lies in the transmission path when detecting said error from the response.

14. The data storage control apparatus according to claim 13, wherein said pair of controllers comprises:
a first pair of controllers being connected to the plurality of disk storage devices via one transmission path, and performing access control of each disk storage device according to an access instruction from said upper level unit; and
a second pair of controllers being connected to the plurality of disk storage devices via another transmission path, and performing access control of each disk storage device according to an access instruction from said upper level unit,
wherein, when one of said first pair controllers detects an error in the access result of the disk storage device via the one transmission path, said one controller detects that the other transmission path is abnormal, and executes an access to the other of said first pair controller via the one transmission path, when the other transmission path is detected abnormal.

15. A fault location diagnosis method for a data storage system connected to a plurality of disk storage devices for storing data via a transmission path, and performing access control of each disk storage device according to an access instruction from an upper level unit, the fault location diagnosis method comprising:
starting diagnosis processing in one controller when said one controller detects an error from a response result received from the disk storage device having been accessed via the one transmission path;
requesting the other controller from the one controller to access, via the other transmission path, the disk storage device having been accessed;
accessing, via the other transmission path, the disk storage device according to said request and receiving a response result from the disk storage device by the other controller;
receiving said response result of the disk storage device from the other controller in one controller; and
identifying whether a suspected fault location lies in the disk storage device or the transmission path from said response result, said identifying comprising:
identifying that said suspected fault location lies in the disk storage device when detecting said error from the response result, and
identifying that said suspected fault location lies in the transmission path when not detecting said error from the response result.

16. The fault location diagnosis method for a data storage system according to claim 15,
wherein the identifying comprises a CRC error, as said response result error of the disk storage device.

17. The fault location diagnosis method for a data storage system according to claim 15,
wherein said detecting an error comprises:

accessing object disk storage device of the read access via the one transmission path according to a read access from the upper level unit, and
detecting an error from a response result received from the disk storage device.

18. The fault location diagnosis method for a data storage system according to claim 15,
wherein said detecting an error comprises:
accessing the object disk storage device of the write access via the one transmission path according to a write access from the upper level unit, and
detecting an error from a response result received from the disk storage device.

19. A fault location diagnosis method for a data storage system which includes at least a pair of controllers being connected to a plurality of disk storage devices for storing data via a transmission path, and performing access control of each disk storage device according to an access instruction from an upper level unit, the fault location diagnosis method comprising:
accessing the disk storage device via the transmission path from one controller;
detecting an error from a response result received from the disk storage device in said one controller; and
starting diagnosis processing in said one controller, the diagnosis processing comprising;
accessing the other controller via the transmission path from said one controller, and receiving a response of said access returned from the other controller via the transmission path, and
identifying whether a suspected fault location lies in the disk storage device or the transmission path from the response result, the identifying comprising:
identifying that said suspected fault location lies in the disk storage device when not detecting said error from the response, and
identifying that laid suspected fault location lies in the transmission path when detecting said error from the response.

20. The fault location diagnosis method for a data storage system according to claim 19,
the starting comprising, in a data storage system including a pair of controllers, being connected to the plurality of disk storage devices via one transmission path, and performing access control of each disk storage device according to an access instruction from said upper level unit and another pair of controller being connected to the plurality of disk storage devices via another transmission path, starting an access of the other controller via the one transmission path after detecting that the other transmission path is abnormal.

21. A fault location method performed by a processor comprising:
accessing a storage via a path from a first controller;
detecting an error from a response received and starting diagnosis in the first controller;
accessing a second controller via the first controller;
receiving a response of the accessing from the second controller via the path; and
identifying whether a suspected fault location lies in the storage or the path from the response result.

* * * * *

UNITED STATES PATENT AND TRADEMARK OFFICE
CERTIFICATE OF CORRECTION

PATENT NO. : 7,562,257 B2
APPLICATION NO. : 11/442969
DATED : July 14, 2009
INVENTOR(S) : Hideo Takahashi Page 1 of 1

It is certified that error appears in the above-identified patent and that said Letters Patent is hereby corrected as shown below:

Column 16, Line 12, change "path ,the" to --path, the--.

Column 16, Line 23, change "faults" to --fault--.

Column 16, Line 62, change "end" to --and--.

Column 17, Line 58, after "comprises" insert --detecting--.

Column 18, Line 37, change "laid" to --said--.

Signed and Sealed this

Third Day of November, 2009

David J. Kappos
*Director of the United States Patent and Trademark Office*